United States Patent
Gloge

(10) Patent No.: US 8,187,151 B2
(45) Date of Patent: May 29, 2012

(54) METHOD FOR CONTROLLING THE OIL SUPPLY OF AN AUTOMATIC PLANETARY TRANSMISSION

(75) Inventor: Oliver Gloge, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 545 days.

(21) Appl. No.: 12/508,244

(22) Filed: Jul. 23, 2009

(65) Prior Publication Data

US 2010/0018808 A1    Jan. 28, 2010

(30) Foreign Application Priority Data

Jul. 24, 2008   (DE) .................... 10 2008 040 665

(51) Int. Cl.
*F16H 61/26* (2006.01)

(52) U.S. Cl. ............................. 477/159; 477/3

(58) Field of Classification Search .............. 477/3, 7, 477/15, 115, 156, 158, 159; 180/65.21, 65.27, 180/65.275, 65.285
See application file for complete search history.

(56) References Cited

U.S. PATENT DOCUMENTS

| | | | |
|---|---|---|---|
| 6,386,170 B1 | 5/2002 | Iwano et al. | |
| 6,692,402 B2 | 2/2004 | Nakamori et al. | |
| 6,705,416 B1 | 3/2004 | Glonner et al. | |
| 6,769,502 B2 * | 8/2004 | Nakamori et al. | 180/65.25 |
| 6,848,548 B2 | 2/2005 | Alfredsson | |
| 6,863,140 B2 | 3/2005 | Noreikat et al. | |
| 7,617,025 B2 * | 11/2009 | Yamamoto et al. | 701/14 |

FOREIGN PATENT DOCUMENTS

| | | |
|---|---|---|
| DE | 199 17 665 A1 | 10/2000 |
| DE | 100 28 074 A1 | 5/2001 |
| DE | 101 60 466 C1 | 6/2003 |
| DE | 600 08 588 T2 | 12/2004 |
| DE | 10 2005 013 137 A1 | 9/2006 |
| WO | 2006/099947 A1 | 9/2006 |
| WO | 2008/055464 A2 | 5/2008 |

* cited by examiner

*Primary Examiner* — Justin Holmes
(74) *Attorney, Agent, or Firm* — Davis & Bujold, P.L.L.C.

(57) ABSTRACT

A method for controlling the oil supply device of an automatic planetary transmission, having a main oil pump and an auxiliary oil pump. The transmission is part of a parallel hybrid vehicle powertrain. To supply oil to the transmission as needed, the current oil requirement of the transmission is determined depending on at least one current operating parameter. The auxiliary pump delivery rate is set by actuating the electric motor, in the combustion and combined driving mode below a minimum main oil pump input speed and in the electric driving mode to at least the total oil requirement, and at least in the combined driving mode above the minimum main oil pump input speed is set to at least the residual oil requirement exceeding the delivery rate of the main oil pump.

23 Claims, 3 Drawing Sheets

METHOD FOR CONTROLLING THE OIL SUPPLY OF AN AUTOMATIC PLANETARY TRANSMISSION

This application is claiming priority from German patent application serial no. 10 2008040 665.1 filed Jul. 24, 2008.

FIELD OF THE INVENTION

The present invention relates to a method for controlling the oil supply device of an automatic planetary transmission comprising a main oil pump, which is mechanically, drivably connected to the drive shaft of an internal combustion engine, and an auxiliary oil pump that may be driven via a controllable electric motor, both of them being hydraulically connected to a main pressure line, the pressure of which is regulated by means of a main pressure regulating valve, on the pressure side, wherein the automatic transmission is part of a parallel hybrid powertrain of a motor vehicle having an input shaft, which may be connected via a separating clutch to the drive shaft of the internal combustion engine and is permanently drivably connected to the rotor of an electric machine. The invention further relates to an oil supply device of an automatic planetary transmission for using the method according to the invention.

BACKGROUND OF THE INVENTION

The task of an oil supply device of an automatic planetary transmission is to provide a sufficiently high oil volume flow and a sufficiently high operating pressure for actuating the friction shift elements, i.e. the shift clutches and shift brakes, as well as for lubricating and cooling the moving parts of the automatic transmission during the operation of the motor vehicle of interest. For this purpose, an oil supply device usually has at least one oil pump, by means of which hydraulic oil can be delivered from a reservoir (oil pan) to a main pressure line and to a secondary pressure line. The shift control valves, which are primarily integrated into a valve block, are connected to the main pressure line that is under a relatively high working pressure (main pressure $P_{HD}$) that can be variably adjusted via a main pressure valve, wherein the shift cylinders of the friction shift elements are pressurized via the shift control valves from the main pressure line in order to engage gears and are discharged into a secondary pressure line or a depressurized line connected to the oil pan via these valves in order to disengage gears. The cooling and lubricating points of the automatic transmission are connected to the secondary pressure line that is under relatively low pressure (secondary pressure $p_{SD}$).

The oil pump is usually configured as a so-called fixed displacement pump, which delivers a constant oil volume per revolution of an associated drive element. Known designs of oil pumps of this type include the gear pump, the rotor pump (sickle pump) and the vane pump. The oil pump may be driven mechanically by a drive connection to a driven shaft, such as the drive shaft of the driving motor or the input shaft of the automatic transmission, or electrically by a drive connection to an associated electric motor. The delivery volume flow and the producible working pressure of the oil pump increase with the rotational speed of the driving component (driven shaft or electric motor) and, in the case of the mechanical drive, are determined by the rotational speed of the respective shaft. In contrast, in the case of the electric drive, the delivery volume flow and the producible working pressure are variably controllable within the control range of the associated electric motor. The delivery power drawn from the driving component for driving the oil pump increases with the delivery volume flow and the working pressure at the output side, against which the oil volume flow is pumped into a pressure line.

As a result of the designs perfected in decades of use, the known types of fixed displacement pumps have high functional reliability and long durability. The disadvantage with fixed displacement pumps of this type is, however, that they cannot generate an appreciable oil volume flow and no high working pressure below a minimum input speed, which may result in an undersupply of the automatic transmission with hydraulic oil, in particular when the driving motor is shut off and when the vehicle is stationary. A further disadvantage of known fixed displacement pumps is that, as they have been configured for providing a high delivery rate even at lower input speeds, they deliver an excessively high oil volume flow at higher input speeds, most of which then must be discharged largely unused, resulting in poor transmission efficiency. Different solutions to improve the oil supply of automatic transmissions have therefore been proposed.

A first known solution consists of designing a mechanically driven adjustable oil pump so that the delivery rate thereof may be varied or maintained constant independently of the input speed within an adjustment range that is specified by the design. Such an oil supply device of an automatic planetary transmission having a mechanically driven, adjustable high pressure oil pump has, for example, been described in DE 600 08 588 T2. In this oil supply device, it is provided that the delivery rate of the high pressure oil pump, and thus the working pressure in the connected main pressure line, is regulated by means of a pressure controlled regulating valve, which is actuated by the working pressure of the main pressure line and by the working pressure of a secondary pressure line. For this purpose, it is provided that the working pressure of the main pressure line is conducted into an associated output actuating cylinder via the regulating valve for the inverse control of the delivery rate of the high pressure oil pump. Although an unnecessarily high delivery rate and the resultant reduction of the transmission efficiency is avoided at higher input speeds by the adjustability of the oil pump, the complexity of a device of this type of oil pump and the associated control device is, however, relatively high and may be associated with a high susceptibility to malfunction.

A further known solution of avoiding delivery rate problems consists of arranging and equipping a single oil pump, such that it may be driven mechanically via a drive shaft of the powertrain or via an associated electric motor, as and when needed.

A hybrid drive of a motor vehicle having an oil supply device of this type is known, for example, from DE 199 17 665 A1. In it, an oil pump is provided that is arranged on the drive shaft of an internal combustion engine and may be driven by the drive shaft of the internal combustion engine via the engagement of an associated clutch and by an associated electric motor when the clutch is disengaged. The oil pump may be configured to provide a relatively low delivery rate and, in case of a higher oil requirement, in particular when the internal combustion engine is shut off or running at low rotational speed, may be driven by the electric motor at a higher rotational speed with an open clutch.

A further hybrid drive of a motor vehicle having an oil supply device of this type has been described in DE 101 60 466 C1. In it, an oil pump is provided that is arranged at the input shaft of an automatic transmission and may be mechanically driven by the input shaft of the automatic transmission via a first overrunning clutch and by the rotor of an associated electric motor via a second overrunning clutch. The oil pump is respectively driven via the faster of the two driving elements, so that a sufficiently high delivery rate of the oil pump may be achieved by a corresponding drive via the electric motor, even with a stationary vehicle or at a low driving speed. The disadvantage of an oil pump of this type is the technical complexity and the required space, as well as the susceptibility to malfunction of both alternative drive branches.

Oil supply devices have therefore also been proposed that comprise a main oil pump mechanically drivably connected to a drive shaft of the powertrain, and an auxiliary oil pump that may be driven by a controllable electric motor. A corresponding oil supply device of the automatic transmission of a hybrid powertrain has been described in U.S. Pat. No. 6,692,402 B2. In the associated method for controlling the auxiliary pump, it is provided that the working pressure in a main pressure line is monitored and that the auxiliary oil pump is activated when the working pressure drops below a first limit value due to an insufficient delivery capacity of the main oil pump that is drivably connected to the input shaft of the automatic transmission, in particular due to increased consumption as a result of shifting effects. The auxiliary oil pump is deactivated again when the working pressure increases above a second limit value, in particular after completing a gear change. In order to avoid an excessively high delivery rate of the auxiliary oil pump, and consequently, too high a working pressure, the oil temperature of the hydraulic oil to be delivered is determined, and the driving power of the electric motor is set as a function of the oil temperature, which is to say increased with increasing oil temperature and reduced with decreasing oil temperature.

A further oil supply device having a mechanically drivable main oil pump and an electrically drivable auxiliary oil pump has been known from DE 10 2005 013 137 A1. It is provided therein that the main oil pump, which is drivably connected to the drive shaft of the internal combustion engine, is supported by the auxiliary oil pump such that it at least delivers a sufficient oil volume flow for cooling the start-up element during start-up. The disadvantage of these known oil supply devices and/or control methods is that the main oil pump is only supported and/or supplemented by the operation of the auxiliary oil pump in certain operating states. The basic problems of an insufficient delivery rate of the main oil pump at low input speeds and excessively high delivery rate at high input speeds have, however, not been comprehensively solved in this way.

SUMMARY OF THE INVENTION

It is therefore the object of the invention to propose a method for controlling an oil supply device of an automatic planetary transmission arranged in a parallel hybrid powertrain, the device comprising a mechanically drivable main oil pump and an electrically drivable auxiliary pump, wherein by means of the method delivering oil is the automatic transmission as needed may be achieved, which is to say a sufficiently high oil delivery rate at low input speeds of the main oil pump may be achieved, and an excessively high oil delivery rate at high input speeds of the main oil pump may be avoided.

A further object is to present an oil supply device of an automatic planetary transmission for using the method according to the invention.

The object concerning the control method is attained in conjunction with the characteristics described, in that the current oil requirement $P_{HD\_soll}$ of the automatic transmission ATG is determined as a function of at least one currently captured operating parameter, and that the delivery rate $P_{ZP}$ of the auxiliary oil pump ZP is set by a corresponding actuation of the associated electric motor in the combustion and combined driving mode below a minimum input speed $(n_{HP}<n_{HP\_min})$ of the main oil pump HP, and in the electric driving mode, to at least the total oil requirement $(P_{ZP} \geq P_{HD\_soll})$ and in the combined driving mode above the minimum input speed $(n_{HP} \geq n_{HP\_min})$ of the main oil pump HP to at least the residual oil requirement $(P_{ZP} \geq \Delta P_{HD} = P_{HD\_soll} - P_{HP})$ exceeding the delivery rate $P_{HP}$ of the main oil pump HP.

The method according to the invention is consequently based on an oil supply device of an automatic planetary transmission, which comprises a main oil pump HP, which is mechanically, drivably connected in a manner known per se to the drive shaft of the internal combustion engine VM, and an auxiliary oil pump ZP, which may be driven via a controllable electric motor, both oil pumps being hydraulically connected on the pressure side to a main pressure line, the pressure of which is regulated by means of a main pressure valve. The automatic transmission ATG of interest is part of a parallel hybrid powertrain of a motor vehicle, which also comprises an internal combustion engine VM and an electric motor EM. The input shaft of the automatic transmission may be connected to the drive shaft of the internal combustion engine VM via a separating clutch K and is permanently, drivably connected to the rotor of the electric motor EM.

According to the invention, in order to sufficiently supply oil to the automatic transmission during the operation of the hybrid powertrain while at the same time avoid an oversupply that may be detrimental to efficiency, it has been provided that the current oil requirement of the automatic transmission ATG, which is specified by the target delivery rate $P_{HD\_soll}$ to be delivered to the main pressure line, is determined as a function of at least one currently captured operating parameter, and that the delivery rate $P_{ZP}$ of the auxiliary pump ZP is set as and when needed by corresponding actuation of the associated electric motor.

As, due to the design thereof, the main oil pump HP has no appreciable delivery rate $P_{HP}$ below the minimum input speed $(n_{HP}<n_{HP\_min})$ thereof, which is to say it cannot deliver a high volume flow $Q_{HP}$ to the main pressure line and cannot build a high working pressure $p_{HD}$ in the main pressure line, the auxiliary oil pump ZP in the combustion mode, in which only the internal combustion motor VM runs in the traction or trailing throttle mode with an engaged separating clutch K, and in the combined driving mode, in which the internal combustion engine VM runs with an engafed separating clutch K in the traction or trailing throttle mode and in which the electric motor EM is operated as a motor or generator, below the minimum input speed $(n_{HP}<n_{HP\_min})$ of the main oil pump HP, is set to at least the total oil requirement $(P_{ZP} \geq P_{HD\_soll})$ of the automatic transmission ATG, which is substantially determined by the sum of the torque $M_{VM}$ output of the internal combustion engine in the traction mode or absorbed in the trailing throttle mode, and the torque $M_{EM}$ output of the electric machine EM in motor mode, or absorbed in generator mode.

Independent of the input speed $n_{HP}$ of the main oil pump HP, this also applies to the electric driving mode, in which only the electric machine EM is operated as a motor or generator, and the internal combustion engine VM is shut off by disengaging separating clutch K, the total oil requirement $(P_{HD\_soll})$ of the automatic transmission ATG in this case being only determined by the torque $M_{EM}$ output by the electric machine EM in motor mode or absorbed in generator mode.

In contrast, above the minimum input speed $(n_{HP} \geq n_{HP\_min})$, the main oil pump HP has a delivery rate $P_{HP}$ that is at least sufficient for the combustion driving mode. It is therefore at least provided in the combined driving mode above the minimum input speed ($n_{HP} \geq n_{HP\_min}$) of the main oil pump HP that the delivery rate $P_{ZP}$ of the auxiliary oil pump ZP is at least set to the previous oil requirement ($P_{ZP} \geq \Delta P_{HD} = P_{HD\_soll} - P_{HP}$) exceeding the delivery rate $P_{HP}$ of the main oil pump HP, whereby a possible undersupply due to the torque $M_{EM}$ additionally output or absorbed by the electric machine EM is avoided.

The main oil pump may therefore be configured such that with relatively low power, and with regard to the delivery rate thereof and be limited to covering the oil requirement based on the output or absorbed torque of the internal combustion engine above the minimum input speed.

Compared to the known oil supply devices and methods for controlling them, the control method according to the invention has the advantage that the main oil pump can be designed to operate with lower power because the delivery shortcoming below the minimum input speed, as well as a possible undersupply, in particular in the combined driving mode above the minimum input speed, are balanced and/or compensated for by a corresponding actuation of the auxiliary oil pump via the delivery rate thereof.

The target delivery rate $P_{ZP\_soll}$ of the auxiliary oil pump ZP, which is the basis for the delivery rate $P_{ZP}$ actually set at the auxiliary oil pump ZP and/or at the associated electric motor, is advantageously determined in the combustion and combined driving mode below the minimum input speed ($n_{HP} < n_{HP\_min}$) of the main oil pump HP, and in the electric driving mode as a function of the target working pressure $P_{HD\_soll}$, which is set via a main pressure valve in the main pressure line, and of the total target oil volume flow $Q_{HD\_soll}$ to be delivered to the main pressure line ($P_{ZP\_soll} = f(P_{HD\_soll}, Q_{HD\_soll})$).

In contrast, the target delivery rate $P_{ZP\_soll}$ of the additional oil pump ZP at least in the combined driving mode above the minimum input speed ($n_{HP} \geq n_{HP\_min}$) of the main oil pump HP is determined as a function of the target working pressure $P_{HD\_soll}$, which is set in the main pressure line via the main pressure valve and of the residual volume flow ($Q_{ZP\_soll} = \Delta Q_{HD} = Q_{HD\_soll} - Q_{HP}$) exceeding the oil volume flow $Q_{HP}$ currently delivered by the main oil pump HP ($P_{ZP\_soll} = f(P_{HD\_soll}, \Delta Q_{HD})$).

As the oil requirement $P_{HD\_soll}$ of the automatic transmission ATG, which is to say the target working pressure $p_{HD\_soll}$ to be set in the main pressure line and the target oil volume flow $Q_{HD\_soll}$ to be delivered to the main pressure line, outside of gear changes is substantially used to keep the friction shift elements of the automatic transmission ATG, which were engaged in the currently engaged gear, engaged in a non-slip manner during the transmission of the current torque $M_{GE}$, and to compensate for the leakage losses occurring at this pressure level, the torque $M_{GE}$ currently transmitted via the input shaft of the automatic transmission is determined as a key operating parameter for determining the current oil requirement $P_{HD\_soll}$, and the oil requirement $P_{HD\_soll}$ of the automatic transmission ATG is determined proportionally to the value of the momentarily transmitted torque $M_{GE}$ ($P_{HD\_soll} \sim |M_{GE}|$), which is to say the oil requirement $P_{HD\_soll}$ is increased in keeping with the torque $M_{GE}$ increasing in value and reduced in keeping with the torque $M_{GE}$ decreasing in value ($P_{HD\_soll} \sim |M_{GE}|$).

As an exact determination of a torque $M_{GE}$ that is small in value as well as the setting of a small delivery rate $P_{ZP}$ to the auxiliary oil pump ZP are relatively difficult and complex from a control engineering point of view, the oil requirement $P_{HD\_soll}$ of the automatic transmission ATG is advantageously limited, for example by specifying a minimum value $p_{HD\_min}$ of the target working pressure $p_{HD\_soll}$ to be set in the main pressure line and/or a minimum value $Q_{HD\_min}$ of the target oil volume flow $Q_{HD\_soll}$ to be delivered to the main pressure line, downward to a minimum oil requirement $P_{HD\_min}$. This also means that the target delivery rate $P_{ZP\_soll}$ of the auxiliary oil pump ZP is likewise limited downward to a minimum delivery rate $P_{ZP\_min}$ when the auxiliary oil pump ZP is operating.

The minimum oil requirement $P_{HD\_min}$ of the automatic transmission ATG is advantageously calculated such that the engaged friction shift elements C1, C2, C3, B1, B2 of the automatic transmission ATG remain fully engaged when a torque ($|M_{GE}| < |M_{GE\_min}|$) is presently transmitted via the automatic transmission and below a specified minimum torque $M_{GE\_min}$. It is thus achieved that, for example, in so-called glide phases (propulsion with switched-off internal combustion engine) or in the transition from the traction mode to the trailing throttle mode, the friction shift elements of the currently engaged gear remain engaged, and during a subsequent increase in the transmitted torque $M_{GE}$ need not be again completely engaged from the trailing throttle mode due to a resultant increase in the working pressure $p_{HD}$ in the main pressure line.

As the viscosity of the hydraulic oil, and consequently the leakage losses in the oil supply device, vary relatively strongly with the oil temperature $T_{Öl}$ of the hydraulic oil, the current oil temperature $T_{Öl}$ of the hydraulic oil delivered by the two oil pumps HP, ZP is determined as a further parameter for determining the oil requirement $P_{HD\_soll}$, and the oil requirement $P_{HD\_soll}$ is corrected upward if the oil temperature ($T_{Öl} > T_{Ref}$) is above a reference temperature $T_{Ref}$, and downward if the oil temperature ($T_{Ö} < T_{Ref}$) is below a reference temperature $T_{Ref}$.

Because without further measures a gear change would result in a temporary decrease in the working pressure $p_{HD}$ in the main pressure line due to filling the actuating cylinder of at least one friction shift element of a target gear, whereby, for example, another friction shift element remaining engaged during the gear change could temporarily slip, it is preferably provided that the oil requirement $P_{HD\_soll}$ of the automatic transmission ATG, and consequently the delivery rate $P_{ZP}$ of the auxiliary oil pump ZP, is increased at the beginning of a gear change and again reduced after completing the gear change. As a result of the temporary increase in the oil requirement $P_{DH\_soll}$, and consequently the delivery rate $P_{ZP}$ of the auxiliary oil pump ZP, the oil volume flow $Q_{HD}$ delivered to the main pressure line is increased while maintaining the working pressure $p_{HD}$, or if the working pressure $p_{HD}$ is increased, the oil volume flow $Q_{HD}$ delivered to the main pressure line is at least kept constant, so that the volume extracted as a result of the filling of the friction shift element is compensated for by the main pressure valve, and a pressure drop in the main pressure line may be avoided.

As an increase in the oil requirement $P_{HD\_soll}$ and/or in the delivery rate $P_{ZP}$ of the auxiliary oil pump ZP at the beginning of a gear change requires a quick response, it is advantageous if driving states are derived from at least one captured operating parameter, which anticipate an impending gear change, and that, if an impending gear change is detected, the oil requirement $P_{HD\_soll}$ of the automatic transmission ATG is increased prior to beginning the gear change. An associated increase in the delivery rate $P_{ZP}$ of the auxiliary oil pump ZP may then be carried out more slowly, which is to say with a smaller gradient, and consequently with less dynamic stress for the components of the pressure supply device.

With an engaged gear and at a driving speed ($v_F \geq v_{min}$) above a determined minimum speed $v_{min}$, the position of the accelerator pedal and/or a change in the position of the accelerator pedal may, for example, be captured, and an increase in the position of the accelerator pedal above a determined limit gradient may be interpreted as a driving state with an impending upshift or downshift, which triggers a corresponding increase in the oil requirement $P_{HD\_soll}$ and in the delivery rate $P_{ZP}$ of the auxiliary oil pump ZP.

Likewise, the position of the accelerator pedal and/or position of the brake pedal or the brake pedal pressure may be captured with an engaged start-up gear and at a driving speed ($v_F<v_{min}$) below a specified minimum speed $v_{min}$, and a release of the accelerator pedal and/or actuation of the brake pedal may be interpreted as an impending gear change for reversing the driving direction (changing from the drive position D to R or vice-versa) and trigger a corresponding increase in the oil requirement $P_{HD\_soll}$, as well as in the delivery rate $P_{ZP}$ of the auxiliary pump ZP.

Furthermore, the position of the brake pedal may be captured with a stationary vehicle ($v_F=0$) and engaged parking lock, and an actuation of the brake pedal in this situation may be interpreted as a driving state with an impending gear change to release the parking lock and engage a start-up gear. Because in order to release the parking lock, an actuating cylinder that is provided for disengaging the locking pawl must be pressurized, and in order to engage a start-up gear the actuating cylinders of at least two friction shift elements must be pressurized, an early increase in the oil requirement $P_{DH\_soll}$ of the automatic transmission ATG and consequently a corresponding increase in the delivery rate $P_{ZP}$ of the auxiliary oil pump ZP are especially useful.

If the gear is not changed as anticipated, which is to say it does not take place within the specified time span $\Delta t_{shift}$ after increasing the oil requirement $P_{HD\_soll}$, the oil requirement $P_{DH\_soll}$ of the automatic transmission ATG should again be reduced in order to avoid an unnecessarily high delivery rate $P_{ZP}$ of the auxiliary pump However, as strong accelerations and decelerations of a motor vehicle normally also cause considerable changes, in particular an increase in the torque $M_{GE}$ transmitted in the automatic transmission ATG, which require a rapid adjustment of the oil requirement $P_{DH\_soll}$ and, if necessary, of the delivery rate $P_{ZP}$ of the auxiliary pump ZP, it is likewise advantageously provided that driving states are derived from at least one captured operating parameter that anticipate an impending strong acceleration or deceleration of the motor vehicle, and that, when an impending strong acceleration or deceleration is detected, the oil requirement $P_{HD\_soll}$ of the automatic transmission ATG is increased even before the acceleration or deceleration is increased.

In this way, with an engaged gear and at a driving speed ($v_F \geq v_{min}$) above a specified minimum speed $v_{min}$, the position of the accelerator pedal and the position of the brake pedal may be detected, and a release of the accelerator pedal and/or actuation of the brake pedal may be interpreted as an impending change of the drive condition from the traction mode to the trailing throttle mode, which triggers a corresponding increase in the oil requirement $P_{HD\_soll}$ and in the delivery rate $P_{ZP}$ of the auxiliary oil pump ZP.

With an engaged forward gear and at a driving speed ($v_F<v_{min}$) below a specified minimum speed $v_{min}$, the position of the accelerator pedal and the change in the position of the accelerator pedal may likewise be detected, and an increase in the position of the accelerator pedal above a specified limit position and/or increase above a specified limit gradient may be interpreted as a driving state with an impending start-up process and trigger a corresponding increase in the oil requirement $P_{HD\_soll}$ and in the delivery rate $P_{ZP}$ of the auxiliary oil pump ZP.

If, however, the anticipated acceleration or deceleration of the motor vehicle has not taken place in the specified time span $\Delta t_{acc}$ after the increase in the oil requirement $P_{HD\_soll}$, the oil requirement $P_{HD\_soll}$ of the automatic transmission ATG should again be reduced to the initial value.

When the auxiliary oil pump is operating, which is to say below the minimum input speed ($n_{HP}<n_{HP\_min}$) of the main oil pump HP in the combustion and combined driving mode, above the minimum input speed ($n_{HP} \geq n_{HP\_min}$) of the main oil pump HP in the electric driving mode and at least in the combined driving mode, the delivery rate $P_{ZP}$ of the main oil pump is advantageously set to a value, which is above the target delivery rate $P_{ZP\_soll}$ required for covering the current oil requirement $P_{HD\_soll}$ of the automatic transmission ATG by at least a specified additional rate amount $\Delta P_{ZP}$ ($P_{ZP} \geq P_{ZP\_zoll}+\Delta P_{ZP}$). As a consequence of the increase in the delivery rate $P_{ZP}$ of the auxiliary oil pump, uncertainties in the exact determination of the oil requirement $P_{HD\_soll}$ as well as a wear-related increase in leakage are taken into account and/or compensated for. In addition, the main pressure valve, via which the working pressure $P_{HD}$ is regulated in the main pressure line, is consequently not completely engaged, but may operate within the regulating range thereof and derive a sufficient oil volume flow to the secondary pressure line for the supply to the cooling and lubrication points of the automatic transmission ATG.

As a result of the good controllability of the auxiliary pump ZP and/or of the associated electric motor, the delivery rate $P_{ZP}$ of the auxiliary oil pump ZP may in each case be continuously adjusted to the currently required target delivery rate $P_{ZP\_soll}$ ($P_{ZP} \sim P_{ZP\_soll}$). This, however, requires permanent regulation of the delivery rate $P_{ZP}$ of the auxiliary oil pump ZP and/or of the rotational speed and torque of the electric motor.

In order to simplify the control of the auxiliary oil pump ZP, it may therefore also be provided that the delivery rate $P_{ZP}$ of the auxiliary oil pump ZP is adjusted to the current target delivery rate $P_{ZP\_soll}$ at specified discrete flow levels $P_{Li}$, wherein a flow level $P_{Li}$ that is greater than or equal to the currently required target delivery rate $P_{ZP\_soll}$ is set by the electric machine of the auxiliary oil pump ZP ($P_{ZP}=P_{Li} \geq P_{ZP\_soll}$).

For an optimal use of the control method according to the invention, the main oil pump HP is preferably configured to cover the oil requirement ($P_{HP}=P_{HD\_VM}$) resulting from the output or absorbed torque $|M_{VM}|$ of the internal combustion engine VM above the minimum input speed ($n_{HP}>n_{HP\_min}$). For this purpose, the auxiliary oil pump ZP and the associated electric motor are preferably configured to cover the oil requirement ($P_{ZP}=P_{HD\_EM}$) resulting from the output or absorbed torque $|M_{EM}|$ of the electric machine EM in the electric driving mode, and to cover the total oil requirement ($P_{ZP}=P_{HD\_soll}$) below the minimum input speed ($n_{HP}<n_{HP\_min}$) of the main oil pump HP as well as the residual oil requirement ($P_{ZP}=\Delta P_{HD}=P_{HD\_soll}-P_{HP}$) exceeding the delivery rate $P_{HP}$ of the main oil pump HP above the minimum input speed ($n_{HP} \geq n_{HP\_min}$) of the main oil pump HP in the combined driving mode.

The auxiliary pump ZP and the associated electric motor may be arranged inside the transmission housing of the automatic transmission ATG, which is to say completely integrated in the automatic transmission ATG.

It is, however, also possible to arrange the auxiliary output pump ZP and the associated electric motor outside the transmission housing of the automatic transmission ATG, and, for example, to be attached outside the transmission housing or to the vehicle body. Although this requires additional installation space, it has the advantage of good accessibility for maintenance and repair works.

BRIEF DESCRIPTION OF THE DRAWINGS

A drawing of an exemplary embodiment is attached to the description for explanation of the present invention. The drawing shows FIG. 1 the determination according to the invention of the delivery rate of an electric auxiliary oil pump in the electric driving mode of a hybrid powertrain based on a torque/rotational speed diagram of an electric machine.

DESCRIPTION OF THE PREFERRED EMBODIMENTS

Figure 3:
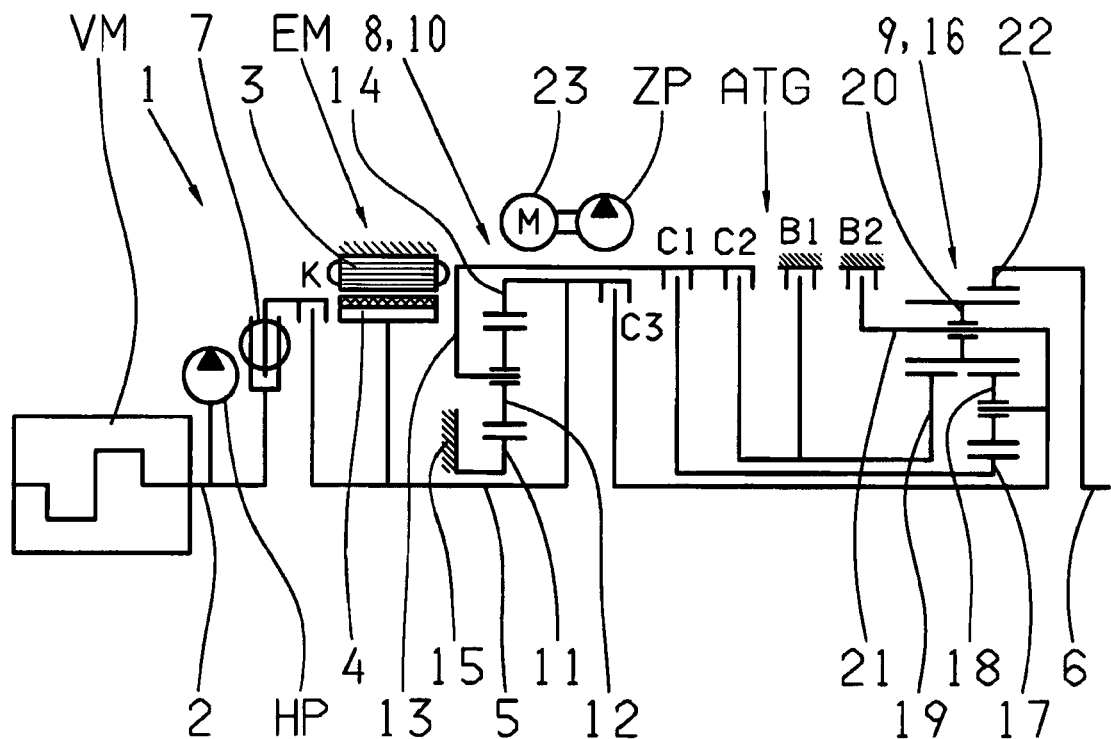
FIG. 3 the configuration of a typical hybrid powertrain for using the method according to the invention, and FIG. 4 the configuration of an oil supply device of an automatic transmission disposed in a hybrid powertrain according to FIG. 3 for using the method according to the invention.

A parallel hybrid powertrain 1 of a motor vehicle according to FIG. 3 comprises an internal combustion engine VM having a drive shaft 2, an electric machine EM with a stator 3 and a rotor 4, and an automatic planetary transmission ATG with an input shaft 5 and an output shaft 6. The input shaft 5 of the automatic transmission ATG may be connected to the drive shaft 2 of the internal combustion engine VM via a separating clutch K and an input-side torsional vibration damper 7 and is permanently drivably connected to the rotor 4 of the electric machine EM.

The automatic transmission ATG, which, by way of example, in this case corresponds to the known multistage transmission 6HP26 from the product portfolio of ZF Friedrichshafen AG, comprises an input-side transmission structure 8 and an output-side transmission structure 9, which are arranged between the input shaft 5 and the output shaft 6 and may be shifted by selectively engaging three shifting clutches C1, C2, C3 and two shifting brakes B1, B2.

The input-side transmission structure 8 is configured as a simple planetary gear set 10 with a sun gear 11, which is permanently fixed with respect to a transmission housing 15, with a group of planetary gears 12, which are engaged for gearing with the sun gear 11 and supported rotatably on a common planet carrier 13, and with a ring gear 14, which meshes with the planetary gears 12 and is permanently non-rotatably connected to the input shaft 5.

The output-side transmission structure 9 is configured as a Ravigneaux gear set 16 with a first, radially smaller sun gear 17, which meshes with a first group of axially short planetary gears 18, and with a second, radially larger sun gear 19, which meshes with a second group of axially long planetary gears 20, which are each engaged for gearing with one of the axially short planetary gears 18, with a planet carrier 21, on which the axially short planetary gears 18 and the axially long planetary gears 20 are rotatably supported, and with a ring gear 22, which meshes with the axially long planetary gears 20 and is permanently non-rotatably connected to the output shaft 6.

The radially smaller sun gear 17 may be selectively connected to the planet carrier 13 of the input-side transmission structure 8 by means of the first shifting clutch C1. The radially larger sun gear 19 may be selectively connected to the planet carrier 13 of the input-side transmission structure 7 by means of the second shifting clutch C2. The planet carrier 21 may be selectively connected to the input shaft 5 by means of the third shifting clutch C3. The radially larger sun gear 19 may be selectively locked with respect to the transmission housing 15 by means of the first shifting brake B1. The planet carrier 21 may be selectively fixed with respect to the transmission housing 15 by means of the second shifting brake B2. This known automatic transmission ATG thus has six forward gears G1 to G6 and one reverse gear R, which may each be implemented by engaging two of the total of five friction shift elements C1, C2, C3, B1, B2.

Figure 4:
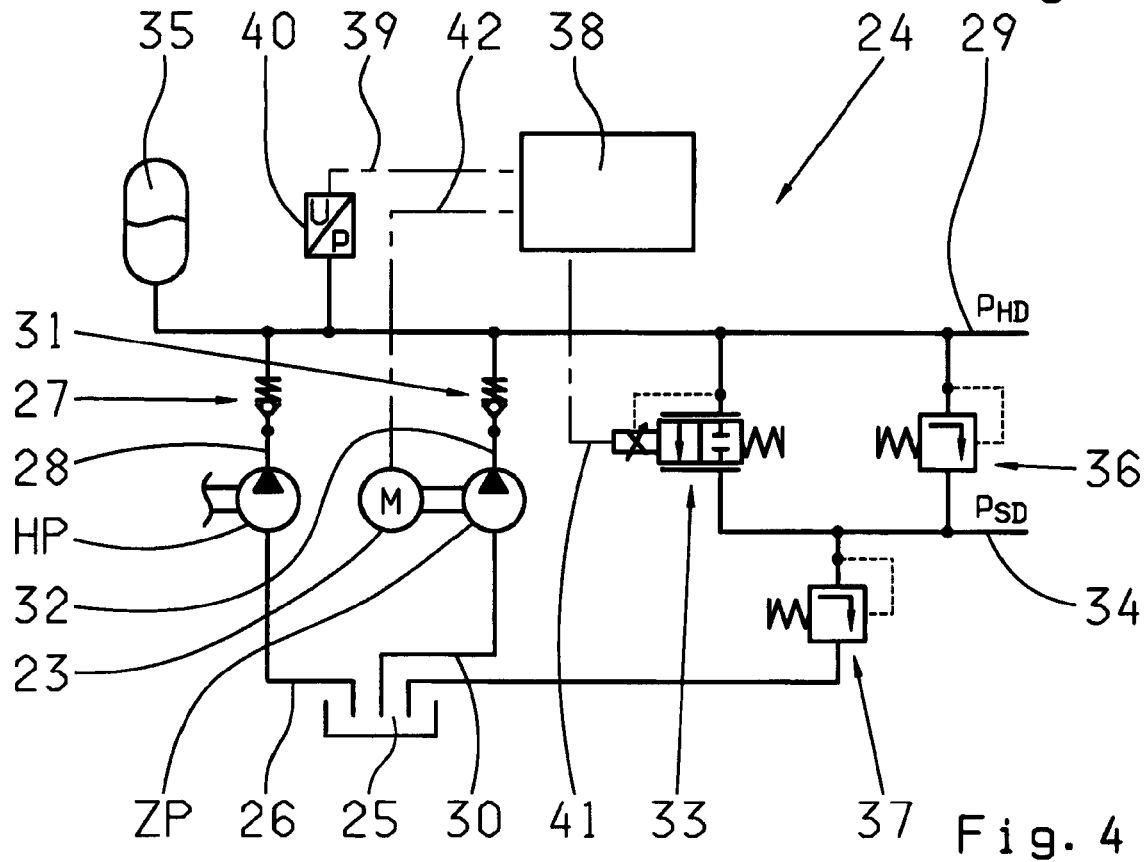

An oil supply device 24 of the automatic transmission ATG shown in more detail in FIG. 4 has a main oil pump HP, which is mechanically drivably connected to the drive shaft 2 of the internal combustion engine VM, and an auxiliary pump ZP, which may be driven via a controllable electric motor 23. Hydraulic oil may be delivered by means of the main oil pump HP from a reservoir 25 (oil pan) via a suction line 26 and a pressure line 28 provided with a check valve 27 to a main pressure line 29, the delivery volume flow $Q_{HP}$ increasing proportionally to the rotational speed $n_{VM}$ of the internal combustion engine VM. By correspondingly actuating the electric motor 23, it is additionally possible to deliver hydraulic oil, as and when needed, in a parallel branch from the reservoir 25 via an associated suction line 30 and a pressure line 32, which is provided with a check valve 31, to the main pressure line 29 by means of the auxiliary pump ZP independently of the rotational speed, which is to say independently of the rotational speed $n_{VM}$ of the internal combustion engine VM or the rotational speed of other drive shafts 5, 6 of the hybrid powertrain 1.

The relatively high working pressure $P_{HD}$ prevailing in the main pressure line 29 may be regulated via the main pressure valve 33, which in the present example is configured as a 2/2-way magnetic regulating valve, via which the excess hydraulic oil is conducted to a secondary pressure line 34. A pressure accumulator 35 is connected to the main pressure line 29 in order to compensate for pressure fluctuations. A pressure limiting valve 36 is additionally arranged between the main pressure line 29 and the secondary pressure line 34 in order to protect the control valves of the friction shift elements C1, C2, C3, B1, B2 connected to the main pressure line 29 from overload. A further pressure limiting valve 37 is arranged between the secondary pressure line 34 and the depressurized oil pan 25 in order to protect the cooling and lubrication points of the automatic transmission ATG connected at a relatively low working pressures $p_{SD}$ to the secondary pressure line 34.

In order to control the working pressure $p_{HD}$ prevailing in the main pressure line 29 and the delivery rate $P_{ZP}$ of the auxiliary oil pump ZP as needed, a control device 38 is provided, which is connected to a pressure sensor 40 connected, via a sensor line 39, to the main pressure line 29, and via associated control lines 41, 42, is connected to the main pressure valve 33 and to the electric motor 23 of the auxiliary oil pump ZP. The oil requirement $P_{HD\_soll}$ of the automatic transmission ATG, which is to say the working pressure $p_{HD}$ to be set in the main pressure line 29 and the total target oil volume flow $Q_{HD\_soll}$ to be delivered to the main pressure line 29, is substantially determined by the torque $M_{GE}$ presently transmitted via the automatic transmission ATG and/or the input shaft 5 thereof. The portion of the delivery rate $P_{HD\_soll}$ that has to be generated by the auxiliary oil pump ZP depends on the current operating mode of the hybrid powertrain 1 and the current delivery rate $P_{HD}$ of the main oil pump HP.

Figure 1:
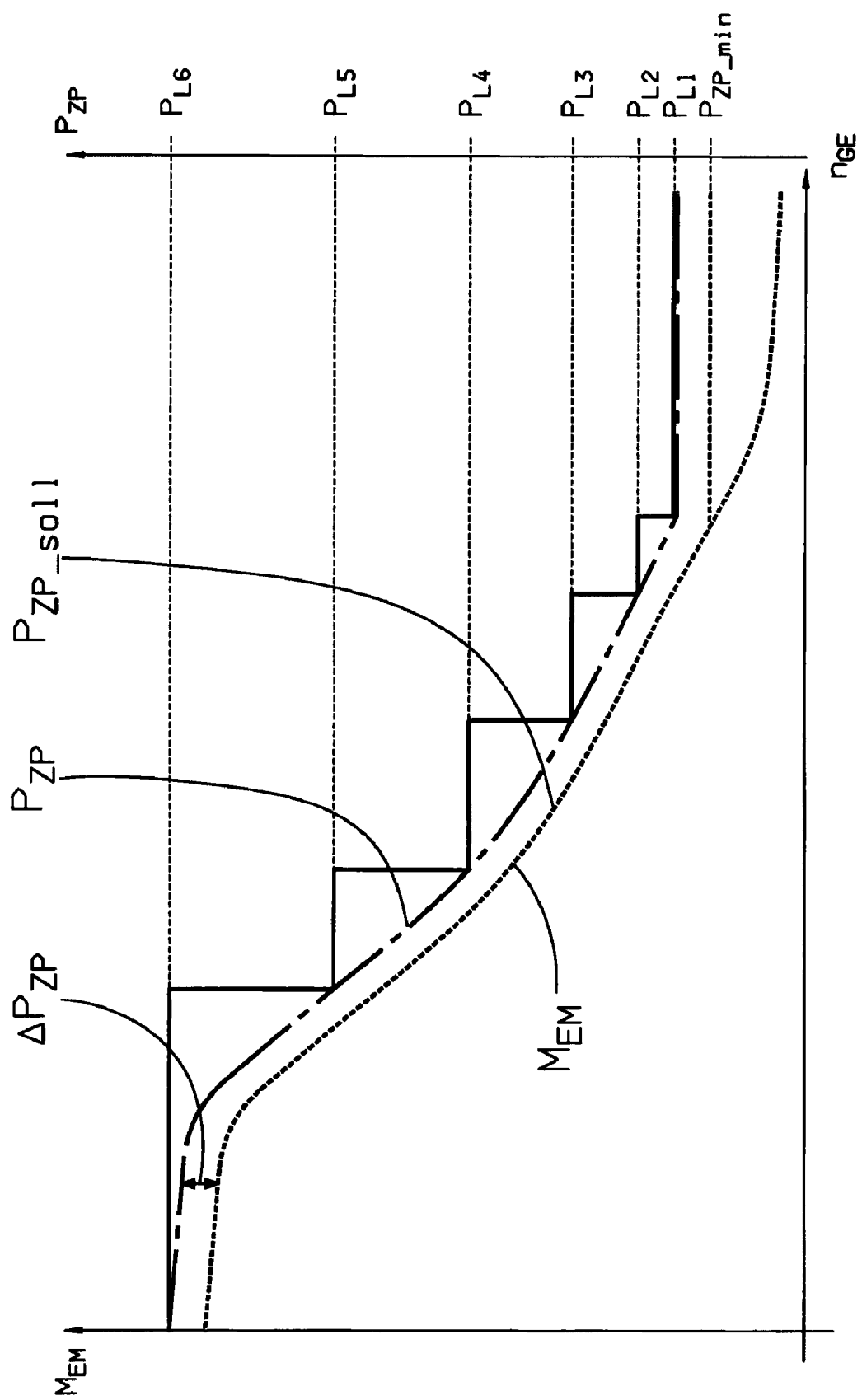

The diagram of FIG. 1 by way of example shows the connection between the transmitted torque $M_{GE}$ and the delivery rate $P_{ZP}$ of the auxiliary oil pump ZP for the electric driving mode of the hybrid powertrain 1, in which the internal combustion engine VM is shut off with a disengaged separating clutch K and the main oil pump HP is consequently deactivated. The interrupted course of the curve reflects the connection between the torque $M_{EM}$ of the electric machine EM and the rotational speed $n_{EM}$ of the electric machine EM and/or the rotational speed $n_{GE}$ of the input shaft 5 of the automatic transmission ATG connected to the rotor 4 of the electric machine EM for the full load operation of the electric machine EM.

If the motor vehicle of interest is started up in the electric driving mode, which is to say only with the driving torque $M_{EM}$ of the electric machine EM, under full load, the oil requirement $P_{HD\_soll}$ of the automatic transmission ATG is consequently specified by the interrupted curve (with the right scale for $P_{ZP}$). As the internal combustion engine VM and the main oil pump HP are shut off in the electric driving mode, the entire oil requirement $P_{HD\_soll}$ of the automatic transmission ATG has to be covered by the operation of the auxiliary oil pump ZP, so that the target delivery rate $P_{ZP\_soll}$ of the auxiliary oil pump ZP corresponds to the total oil requirement $P_{HD\_soll}$ of the automatic transmission ATG.

The target delivery rate $P_{ZP\_soll}$ of the auxiliary oil pump ZP, however, advantageously is limited downward by the specification of a minimum delivery rate $P_{ZP\_min}$, since the exact determination of a torque $M_{EM}$ that is small in value as well as the setting of a small delivery rate $P_{ZP}$ at the auxiliary oil pump ZP are relatively difficult and complex from a control engineering point of view. Likewise, the delivery rate $P_{ZP}$ of the auxiliary oil pump ZP is advantageously not set exactly to the determined value of the target delivery rate $P_{ZP\_soll}$, but set to a value which by at least a specified added rate amount $\Delta P_{ZP}$ exceeds the target delivery rate $P_{ZP\_soll}$ required to cover the current oil requirement $P_{HD\_soll}$ of the automatic transmission ATG ($P_{ZP} > P_{ZP\_soll} + \Delta P_{ZP}$).

The added rate amount $\Delta P_{ZP}$ is a control reserve, by means of which uncertainties in the exact determination of the oil requirement $P_{HD\_soll}$ as well as a wear-induced increase in leakage are taken into account and/or compensated for. The dot-dash curve in FIG. 1 shows a continuous adaptation of the delivery rate $P_{ZP}$ ($P_{ZP} = P_{ZP\_soll} + \Delta P_{ZP}$), at which it is reduced in keeping with the torque $M_{EM}$ decreasing with increasing rotational speed $n_{GE}$.

In order to simplify the control of the auxiliary oil pump ZP, it may therefore also be provided that adaptation of the delivery rate $P_{ZP}$ of the auxiliary oil pump ZP to the target delivery rate $P_{ZP\_soll}$ also takes place at specified discrete rate levels $P_{Li}$ ($P_{L1}$ to $P_{L6}$), wherein a rate level $P_{Li}$, which is greater than or equal to the currently required target delivery rate $P_{ZP\_soll}$ plus the capacity reserve $\Delta P_{ZP}$ ($P_{ZP} = P_{Li} \geq P_{ZP\_soll} + \Delta P_{ZP}$), is respectively set at the electric machine of the auxiliary oil pump ZP. The gradual adaptation of the delivery rate $P_{ZP}$ of the auxiliary oil pump ZP is shown in FIG. 1 by the uninterrupted step-shaped curve.

Figure 2:
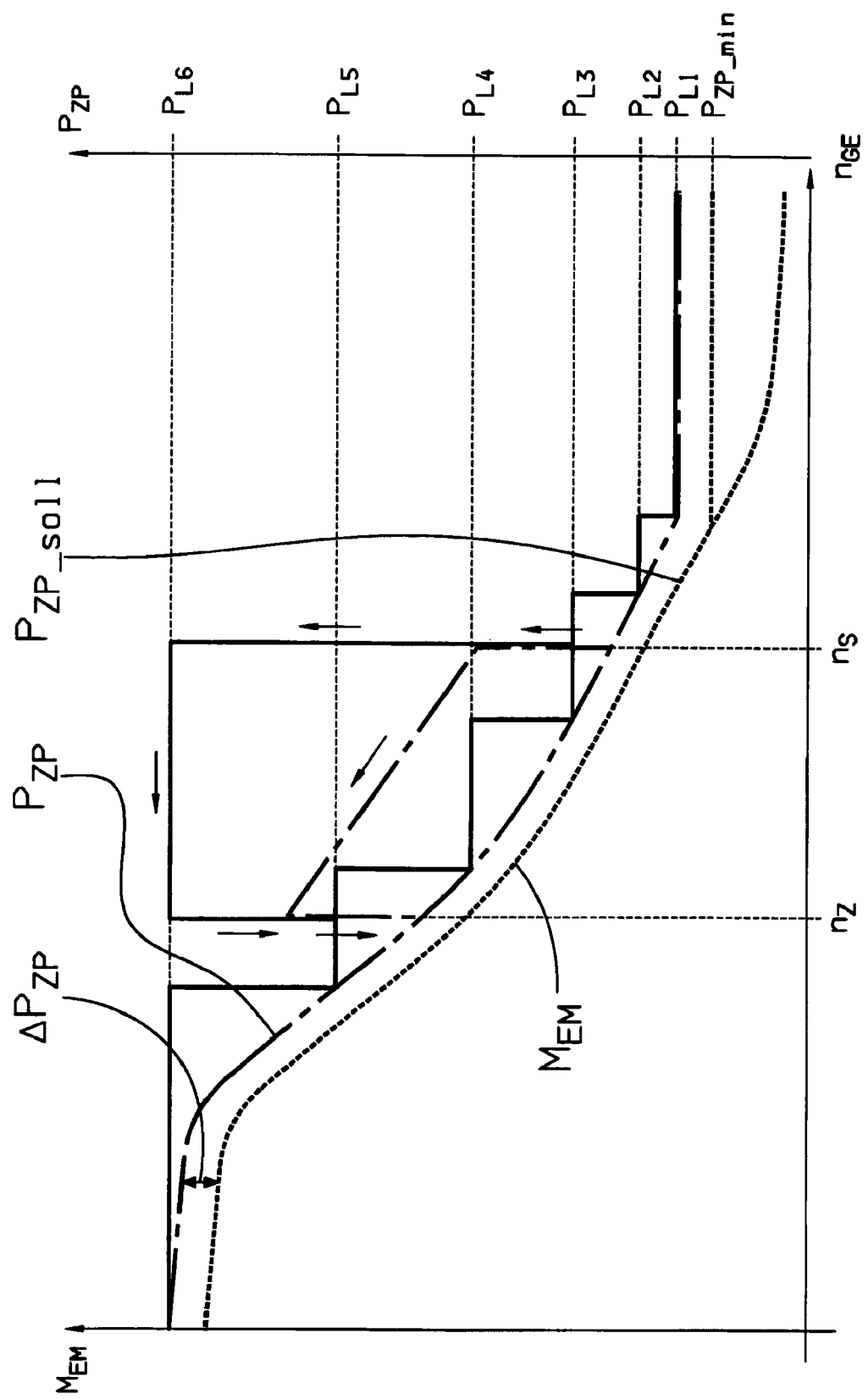
FIG. 2 a shift-dependent increase in the delivery rate of an electric auxiliary oil pump in the electric driving mode of the hybrid powertrain based on the torque/rotational speed diagram according to FIG. 1.

If an upshift is performed during start-up in order to increase the accelerating power, the delivery rate $P_{ZP}$ of the auxiliary oil pump ZP is increased to cover the increased requirement induced by the pressurization of at least one friction shift element (C1, C2, C3, B1, B2) at the latest as the shifting rotational speed $n_s$, which is to say when shifting is started, is reached, and is again decreased at the earliest when the target rotational speed $n_z$ is reached, which is to say when shifting is completed. This procedure is shown in the diagram of FIG. 2 with the dot-dashed course of the curve marked with directional arrows for a continuous adaptation of the delivery rate $P_{ZP}$ of the auxiliary pump ZP, and the uninterrupted course of the curve marked with directional arrows for a gradual adaptation of the delivery rate $P_{ZP}$ of the auxiliary oil pump ZP.

REFERENCE NUMERALS

1 parallel hybrid powertrain
2 drive shaft
3 stator
4 rotor
5 input shaft
6 output shaft
7 torsional vibration damper
8 input-side transmission structure
9 output-side transmission structure
10 planetary gear set
11 sun gear
12 planetary gear
13 planet carrier
14 ring gear
15 transmission housing
16 Ravigneaux gear set
17 sun gear
18 planetary gear
19 sun gear
20 planetary gear
21 planet carrier
22 ring gear
23 electric motor
24 pressure supply device
25 reservoir, oil pan
26 suction line
27 check valve
28 pressure line
29 main pressure line
30 suction line
31 check valve
32 pressure line
33 main pressure valve
34 secondary pressure line
35 pressure reservoir
36 pressure limiting valve
37 pressure limiting valve
38 control device
39 sensorline
40 pressure sensor
41 control line
42 control line
ATG automatic planetary transmission
B1 shifting brake, friction shift element of ATG
B2 shifting brake, friction shift element of ATG
C1 shifting clutch, friction shift element of ATG
C2 shifting clutch, friction shift element of ATG
C3 shifting clutch, friction shift element of ATG
D drive position ATG
EM electric machine
G1-G6 forward gear of ATG
HP main oil pump
K separating clutch
M torque
$M_{EM}$ torque of EM
$M_{GE}$ transmitted torque at the input shaft of ATG $M_{GE\_min}$ minimum torque at the input shaft of ATG
$M_{VM}$ torque of VM
n rotational speed
$n_{GE}$ rotational speed of the input shaft
$n_{HP}$ input speed of HP
$n_{HP\_min}$ minimum input speed of HP
p pressure
$p_{HD}$ working pressure in the main pressure line, main pressure
$p_{HD\_min}$ minimum working pressure in the main pressure line
$p_{HD\_soll}$ target working pressure in the main pressure line, target main pressure
$p_{SD}$ working pressure in the secondary pressure line, secondary pressure
P flow rate
$P_{HD\_min}$ minimum oil requirement in the main pressure line
$P_{HD\_soll}$ oil requirement of ATG, target delivery rate in the main pressure line
$P_{HP}$ delivery rate of HP
$P_{Li}$ discrete rate level of ZP
$P_{L1}$-$P_{L6}$ discrete rate level of ZP
$P_{ZP}$ delivery rate of ZP
$P_{ZP\_min}$ minimum delivery rate of ZP
$P_{ZP\_soll}$ target delivery rate of ZP
$Q_{HD}$ volume flow delivered to the main pressure line
$Q_{HD\_min}$ minimum oil volume flow delivered to the main pressure line
$Q_{HD\_soll}$ target oil volume flow delivered to the main pressure line
$Q_{HP}$ volume flow delivered by HP
R drive position, reverse gear of ATG
$T_{Öl}$ oil temperature
$T_{Ref}$ reference temperature
$v_F$ driving speed
$v_{min}$ minimum speed
VM internal combustion engine
ZP auxiliary oil pump
$\Delta P_{HD}$ residual oil requirement in the main oil line
$\Delta P_{ZP}$ added rate amount of ZP
$\Delta Q_{HD}$ residual oil volume flow in the main pressure line
$\Delta t_{acc}$ time span for acceleration or deceleration
$\Delta t_{shift}$ time span for gear change

The invention claimed is:

1. A method for controlling the oil supply device of an automatic planetary transmission, which comprises a main oil pump (HP), mechanically drivably connected to the drive shaft (2) of an internal combustion engine (VM), and an auxiliary oil pump (ZP), drivable via a controllable electric motor (23), and both of the main oil pump (HP) and the auxiliary oil pump (ZP) being hydraulically connected, on a pressure side, to a main pressure line (29) pressure regulated by a main pressure regulating valve (33), the automatic transmission (ATG) being part of a parallel hybrid powertrain (1) of a motor vehicle having an input shaft (5), which may be connected via a separating clutch (K) to the drive shaft (2) of the internal combustion engine (VM) and is permanently drivably connected to the rotor (4) of an electric machine (EM), the method comprising the steps of:
determining a current oil requirement ($P_{HD\_soll}$) of the automatic transmission (ATG) as a function of at least one currently captured operating parameter;
setting a delivery rate ($P_{ZP}$) of the auxiliary oil pump (ZP), by a corresponding actuation of the associated electric motor (23) in a combustion and a combined driving mode below a minimum input speed ($n_{Hp}<n_{HP\_min}$) of the main oil pump (HP) and in an electric driving mode, to at least a total oil requirement ($P_{ZP} \geq P_{HD\_soll}$); and
setting the delivery rate ($P_{ZP}$) of the auxiliary oil pump (ZP) to at least a residual oil requirement ($P_{ZP} \geq \Delta P_{HD} = P_{HD\_soll} - P_{HP}$) exceeding the delivery rate ($P_{ZP}$) of the main oil pump (HP), at least in the combined driving mode above the minimum input speed ($n_{HP} \geq n_{HP\_min}$) of the main oil pump (HP).

2. The method according to claim 1, further comprising the step of determining a target delivery rate ($P_{ZP\_soll}$) of the auxiliary oil pump (ZP) in the combustion and the combined driving mode below the minimum input speed ($n_{HP}<n_{HP\_min}$) of the main oil pump (HP) and in the electric driving mode as a function of a target working pressure ($p_{HD\_soll}$) in the main oil pressure line and of a total target oil volume flow ($Q_{HD\_soll}$) to be delivered to the main oil pressure line ($P_{ZP\_soll}=f(p_{HD\_soll}, Q_{HD\_soll})$).

3. The method according to claim 1, further comprising the step of determining a target delivery rate ($P_{ZP\_soll}$) of the auxiliary oil pump (ZP), at least in the combined driving mode above the minimum input speed ($n_{HP} \geq n_{HP\_min}$) of the main oil pump (HP), as a function of the target working pressure ($p_{HD\_soll}$) in the main pressure line and of the residual oil volume flow ($Q_{ZP\_soll}=\Delta Q_{HD}=Q_{HD\_soll}-Q_{HP}$) exceeding a currently delivered oil volume flow ($Q_{HP}$) by the main oil pump (HP), ($P_{ZP\_soll}=f(p_{HD\_soll}, \Delta Q_{HD})$).

4. The method according to claim 1, further comprising the step of determining a torque ($M_{GE}$) currently transmitted via the input shaft (5) of the automatic transmission (ATG) as a key operating parameter, and determining the oil requirement ($P_{HD\_soll}$) of the automatic transmission (ATG) proportionally to the amount of the presently transmitted torque ($M_{GE}$) ($P_{HD\_soll} \sim |M_{GE}|$).

5. The method according to claim 1, further comprising the step of limiting the oil requirement ($P_{HD\_soll}$) of the automatic transmission (ATG) downward to a minimum oil requirement ($P_{HD\_min}$).

6. The method according to claim 5, further comprising the step of, if a torque ($|M_{GE}|<|M_{GE\_min}|$) presently transmitted via the automatic transmission (ATG) is below a specified minimum torque ($M_{GE\_min}$), calculating the minimum oil requirement ($P_{HD\_min}$) of the automatic transmission (ATG) such that engaged friction shift elements (C1, C2, C3, B1, B2) of the automatic transmission (ATG) remain engaged slip-free.

7. The method according to claim 1, further comprising the step of determining a current oil temperature ($T_{Öl}$) of the hydraulic oil delivered by the oil pumps (HP, ZP) as a further operating parameter, and correcting the oil requirement corrected upward when the oil temperature ($T_{Öl}>T_{Ref}$) is above a reference temperature ($T_{Ref}$), and downward when the oil temperature ($T_{Öl}<T_{Ref}$) is below the reference temperature ($T_{Ref}$).

8. The method according to claim 1, further comprising the step of increasing the oil requirement ($P_{HD\_soll}$) of the automatic transmission (ATG) at a beginning of a gear change and again reducing once the gear change is completed.

9. The method according to claim 1, further comprising the step of deriving driving states from at least one captured operating parameter, which anticipates an impending gear change, and increasing the oil requirement ($P_{HD\_soll}$) of the automatic transmission (ATG), upon determining an impending gear change, even before the gear change is started.

10. The method according to claim 9, further comprising the step of at least one of detecting a position of an accelerator pedal and a change of the position of the accelerator pedal, and interpreting an increase in the position of the accelerator pedal above a specified limit gradient as a driving state with either an impending upshift or downshift when the gear is engaged and the driving speed ($v_F \leqq v_{min}$) is above a specified minimum speed ($v_{min}$).

11. The method according to claim 9, further comprising the step of detecting at least one of a position of an accelerator pedal and a position of a brake pedal or a brake pedal pressure with an engaged start-up gear and a driving speed ($v_F < v_{min}$) below a specified minimum speed ($v_{min}$), and interpreting at least one of a release of the accelerator pedal and an actuation of the brake pedal as a driving state with an impending gear change for reversing driving direction.

12. The method according to claim 9, further comprising the step of detecting a position of a brake pedal, and interpreting an actuation of the brake pedal as a driving state with an impending gear change in the form of releasing a parking lock and engaging a start-up gear with a stationary vehicle ($v_F = 0$) and an engaged parking lock.

13. The method according to claim 9, further comprising the step of, if the anticipated gear change does not take place within a specified time span ($\Delta t_{shift}$) after increasing the oil requirement ($P_{HD\_soll}$) reducing the oil requirement ($P_{HD\_soll}$) of the automatic transmission (ATG).

14. The method according to claim 1, further comprising the step of deriving driving states from at least one captured operating parameter, which anticipates an one of an impending strong acceleration or deceleration of the motor vehicle, and increasing the oil requirement ($P_{HD\_soll}$) of the automatic transmission (ATG), even before one of acceleration or deceleration is started, on determining an impending strong acceleration or deceleration.

15. The method according to claim 14, further comprising the step of, above a specified minimum speed ($v_{min}$), detecting a position of an accelerator pedal and a position of a brake pedal with an engaged gear and a driving speed ($v_F \geqq v_{min}$), and interpreting at least one of a release of the accelerator pedal and an actuation of the brake pedal as a driving state with an impending change from a traction mode to a trailing throttle mode.

16. The method according to claim 14, further comprising the step of, when a forward start-up gear is engaged and the driving speed ($v_F < v_{min}$) is below a specified minimum speed ($v_{min}$), detecting a position of an accelerator pedal and the change in the position of the accelerator pedal, and interpreting at least one of a position of the accelerator pedal above a specified limit position and an increase in the position of the accelerator pedal above a specified limit gradient as a driving state with an impending start-up.

17. The method according to claim 14, further comprising the step of reducing the oil requirement ($P_{HD\_soll}$) of the automatic transmission (ATG) if the anticipated acceleration or deceleration of the motor vehicle does not take place within a specified time span ($\Delta t_{acc}$) after increasing the oil requirement ($P_{HD\_soll}$).

18. The method according to claim 1, further comprising the step of setting the delivery rate ($P_{ZP}$) of the auxiliary oil pump (ZP), during operation of the auxiliary oil pump (ZP), to a value which is at least above the target delivery rate ($P_{ZP\_soll}$), which is required to cover the current oil requirement ($P_{HD\_soll}$) of the automatic transmission (ATG), by a specified added rate amount ($P_{ZP}$) ($P_{ZP} \geqq P_{ZP\_soll} + \Delta P_{ZP}$).

19. The method according to claim 1, further comprising the step of continuously adapting the delivery rate ($P_{ZP}$) of the auxiliary oil pump (ZP) to the currently required target delivery rate ($P_{ZP\_soll}$) ($P_{ZP} \sim P_{ZP\_soll}$).

20. The method according to claim 1, further comprising the step of adjusting the delivery rate ($P_{ZP}$) of the auxiliary oil pump (ZP) to the current target delivery rate ($P_{ZP\_soll}$) at specified discrete rate levels (PLi), and a rate level ($P_{Li}$), that is greater than or equal to the currently required target delivery rate ($P_{ZP\_soll}$), is respectively adjusted by the electric machine of the auxiliary oil pump (ZP) ($P_{ZP} = P_{Li} \geqq P_{ZP\_soll}$).

21. An oil supply device of an automatic planetary transmission, the supply device comprising a main oil pump (HP), mechanically drivably connected to a drive shaft (2) of an internal combustion engine (VM), and an auxiliary oil pump (ZP), drivable by a controllable electric motor (23), both the main oil pump (HP) and the auxiliary oil pump (ZP) being hydraulically connected, on a pressure side, to a main pressure line (29) that is pressure-regulated by a main pressure valve (33), the automatic transmission (ATG) being part of a parallel hybrid power train (1) of a motor vehicle and having an input shaft (5), which is connectable to the drive shaft (2) of the internal combustion engine (VM) via a separating clutch (K) and is permanently drivably connected to a rotor (4) of an electric machine (EM);

the main oil pump (HP) covers an oil requirement ($P_{HP} = P_{HD\_VM}$) induced by either an output torque or an absorbed torque ($|M_{VM}|$) of the internal combustion engine (VM) above a minimum input speed ($n_{Hp} > n_{HP\_min}$);

the auxiliary oil pump (ZP) and the electric motor (23) cover an oil requirement ($P_{ZP} = P_{HD\_EM}$) in an electric driving mode induced by the one of the torque output or the absorbed torque ($|M_{EM}|$) of the electric machine (EM), and cover a total oil requirement ($P_{ZP} = P_{HD\_soll}$) below the minimum input speed ($n_{HP} < n_{HD\_min}$) of the main oil pump (HP) as well as of a residual oil requirement ($P_{ZP} = \Delta P_{HD} = P_{HD\_soll} P_{HP}$) exceeding a delivery rate ($P_{HP}$) of the main oil pump (HP) above the minimum input speed ($n_{HP} \geqq n_{HD\_min}$) of the main oil pump (HP) in a combined driving mode; and a current oil requirement ($P_{HD\_soll}$) of the automatic transmission (ATG) is determined as a function of at least one currently captured operating parameter, and a delivery rate ($P_{ZP}$) of the auxiliary oil pump (ZP), by corresponding actuation of the associated electric motor (23) in a combustion driving mode and a combined driving mode below the minimum input speed ($n_{HP} < n_{HP\_min}$) of the main oil pump (HP) and in the electric driving mode is set to at least the total oil requirement ($P_{ZP} \geqq P_{HD\_soll}$), and at least in the combined driving mode above the minimum input speed ($n_{HP} \geqq n_{HP\_min}$) of the main oil pump (HP) is set to at least the residual oil requirement ($P_{ZP} \geqq \Delta P_{HD} = P_{HD\_soll} - P_{HP}$) exceeding the delivery rate ($P_{HP}$) of the main oil pump (HP).

22. The oil supply device according to claim 21, wherein the auxiliary oil pump (ZP) and the associated electric motor (23) are arranged inside a transmission housing (15) of the automatic transmission (ATG).

23. The oil supply device according to claim 22, wherein the auxiliary oil pump (ZP) and the associated electric motor (23) are arranged outside the transmission housing (15) of the automatic transmission (ATG).

* * * * *